United States Patent [19]
Matsumoto et al.

[11] Patent Number: 5,570,220
[45] Date of Patent: Oct. 29, 1996

[54] APPARATUS FOR TRANSMITTING LIGHTWAVE

[75] Inventors: Kenji Matsumoto, Yokohama; Shigeyuki Itoh, Kawasaki; Kenji Sano, Yokohama; Jun Kobayashi, Katsuta; Koji Mori, Katsuta; Kenji Okada, Katsuta, all of Japan

[73] Assignee: Hitachi, Ltd., Tokyo, Japan

[21] Appl. No.: 309,412

[22] Filed: Sep. 20, 1994

[30] Foreign Application Priority Data

Sep. 20, 1993 [JP] Japan ................................. 5-233045

[51] Int. Cl.$^6$ ........................... H04B 10/00; H04N 5/225
[52] U.S. Cl. ........................ 359/146; 359/172; 358/906; 348/373; 348/343; 348/344; 348/6
[58] Field of Search ....................... 348/372, 375, 348/374, 376, 6, 723, 725, 343, 344, 359, 734, 335, 12, 16; 358/906, 909.1, 335; 359/161, 172, 118, 146, 142

[56] References Cited

U.S. PATENT DOCUMENTS

| | | | |
|---|---|---|---|
| 4,864,651 | 9/1989 | Ogiwara et al. | 359/161 |
| 5,009,501 | 4/1991 | Fenner et al. | 356/152 |
| 5,291,343 | 3/1994 | Goto | 348/734 |
| 5,341,171 | 8/1994 | Mori et al. | 348/373 |

FOREIGN PATENT DOCUMENTS

| | | |
|---|---|---|
| 62-032730 | 7/1987 | Japan . |
| 03214881 | 12/1991 | Japan . |
| 04042673 | 5/1992 | Japan . |

OTHER PUBLICATIONS

*NTZ Nachrichtentechnische Zeitschrift*, "Halbleiterlaser–Verstärker für Optisches HDTV Übertragungssystem", H. Ehlers, et al., vol. 43, No. 1, Jan. 1990, Berlin DE.

*IEEE Transactions on Consumer Electronics*, "A Spatial Optical Transmission System for Audio–Video Signal", Y. Ishida, et al., vol. 39, No. 3, Aug. 1993, New York, NY.

Primary Examiner—Leo Boudreau
Assistant Examiner—Bhavesh Mehta
Attorney, Agent, or Firm—Antonelli, Terry, Stout & Kraus

[57] ABSTRACT

Apparatus for achieving contact-less linking between a transmitting unit and a receiving unit when transmitting video signal, audio signal, control signal, or digital data therebetween. The apparatus includes a switch circuit which switches the output signal of a light emitting integrated circuit to a first set of light guides for spatial transmission of an optical signal representing the video, audio and control signals and digital data and to a second set of light guides for near-by transmission of the optical signal.

53 Claims, 13 Drawing Sheets

FIG. 16
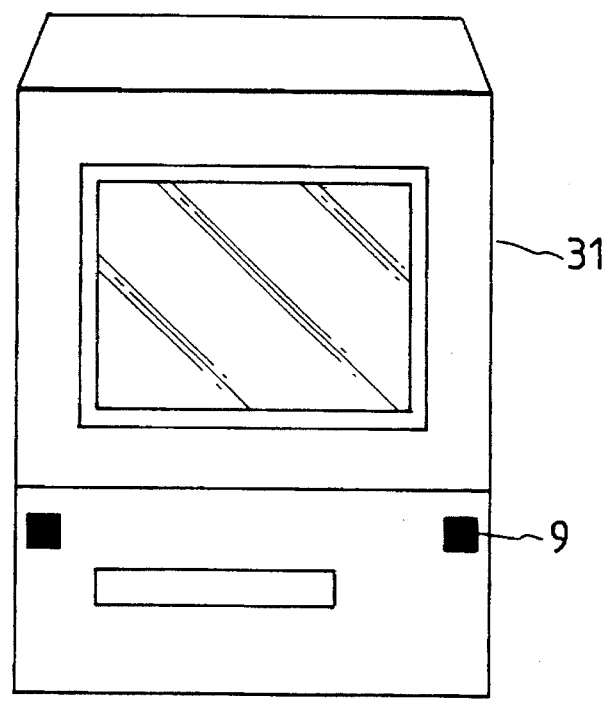
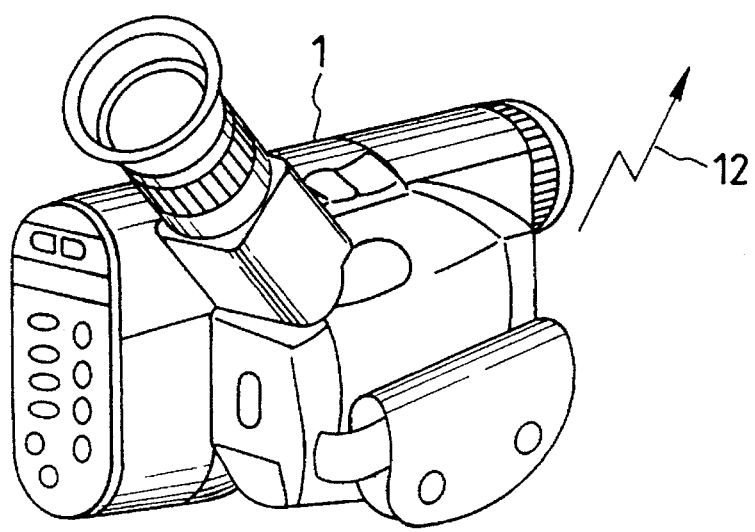

APPARATUS FOR TRANSMITTING LIGHTWAVE

BACKGROUND OF THE INVENTION

The present invention relates to apparatus for transmitting a lightwave signal. More particularly, the present invention relates to apparatus for transmitting a video signal, audio signal, control signal, or digital data between a transmitting unit, such as a single-unit video-camera recorder, and a receiving unit connected to a television receiver using a lightwave signal so as to provide a contactless link between the units.

With the widespread use of single-unit video-camera recorders among general users the portability and ease of carrying such units have become an important factor. Thus, most manufacturers has been miniaturizing the circuits and mechanisms of such units and reducing the weight thereof. Further manufacturers have developed high-performance apparatuses capable of performing many different operations to increase the competitiveness of such units.

However, increasing the capability of such high-performance single-unit video-camera recorders to perform many different operations has resulted in an increase in the number of buttons on such units. Further, the operation of such units have become complex causing general users to experience some difficulty in taking pictures using the units. Such difficulty in use could become a factor to prevent widespread use of the single-unit video-camera recorder. Accordingly, in recent years, single-unit video-camera recorders, having the capability of performing a limited number of operations, have been marketed. Thus, it is the aim of the manufacturers to provide products easily usable by any person and to thereby spread the use of audio-visual (AV) equipment.

Currently when playing back signals on a single-unit video-camera recorder, some trouble is experienced, linking the single-unit video-camera recorder and a television receiver. A cord connected between the single-unit video-camera recorder and television receiver transmits signals from one unit to the other. Accordingly, there is provided a single-unit video-camera recorder such as described on page 29 in the operation manual of SONY single-unit video-camera recorder, Model CCD-TR1, having a station on which the single-unit video-camera recorder can be fixedly held. The station being connected to the single-unit video-camera recorder permits, in just one-touch operation, playing back of signals in the television receiver.

Even when such a station is used, however, it is still necessary for the user, when mounting the single-unit video-camera recorder on the station, to align the single-unit video camera recorder and the station and slide the station to the appropriate location relative to the single-unit video-camera recorder. Thus, the system can not be easily used by general users. Further, since there are provided many terminals for connecting signals and power on the body, it is structurally difficult to make the body waterproof and drip-proof.

While the above mentioned problems are those related to signal transmission between a single-unit video-camera recorder and a television receiver, there also arise similar problems when signals are transmitted between a single-unit video-camera recorder and a personal computer or between a pen-input personal computer and a desk-top personal computer, or the like.

SUMMARY OF THE INVENTION

An object of the present invention is to solve the above mentioned problems by providing apparatus for transmitting lightwave signal representing a video signal, an audio signal, a control signal, and/or a digital data between a transmitting unit and a receiving unit, to achieve a contactless link between the units, and, further, to improve ease of use of a single-unit video-camera recorder having the transmitting unit and to provide a structure suitable for water-proof and drip-proof specifications.

Another object of the present invention is to provide interface apparatus for interfacing a signal producing apparatus with a display apparatus having a display screen and an audio output device.

In order to achieve the above-mentioned object, the present invention provides apparatus for converting at least two of video, audio, control and digital data signals into optical signals and transmitting the optical signals from a transmitting unit to a receiving unit. The apparatus of the present invention includes modulation apparatus for modulating each of the at least two signals, multiplex apparatus for frequency-multiplexing the at least two signals modulated by the modulation apparatus, electrical-optical conversion apparatus for converting the signal obtained by multiplexing in the multiplex apparatus into an optical signal and at least one set of first light guides for guiding the optical signal obtained by conversion in the electrical-optical conversion apparatus so as to be emitted from the transmitting unit. Each of the set of first light guides is provided on the side of the transmitting unit and at least one set of second light guides is provided for receiving an optical signal emitted from the side of the transmitting unit and guiding the optical signal into a receiving unit.

Further the apparatus of the present invention includes a switch for selecting either the set of first light guides or the set of second light guides based on an indication whether spatial transmission between the transmitting unit and the receiving unit is to be conducted or near-by transmission between the transmitting unit and the receiving unit is to be conducted. Spatial transmission is conducted when the transmitting unit is positioned a distance from the receiving unit. Near-by transmission is conducted when the transmitting unit is mounted on the receiving unit.

An Optical-electrical conversion apparatus is provided for converting the optical signal from the selected first or second light guides into an electric signal. Also demodulation apparatus is provided for demodulating the electric signal obtained by conversion in the optical-electrical conversion apparatus thereby obtaining the at least two signals. The first and second light guides produce attenuation of the optical signal at different levels from each other.

Thus, by use of the present invention a contactless link is achieved between the transmitting and receiving units permitting ease of use of the apparatus. Further, by the apparatus of the present invention it is possible to provide a structure having fewer terminals for signal connections allowing the apparatus to meet waterproof and drip-proof specifications.

For example, transmission of video and audio signals between a single-unit video-camera recorder and a station is performed by contactless transmission through the use of infrared light and the mechanical contact between the single-unit video-camera recorder and station can be limited to only a terminal for power. Therefore, a really usable system can be provided in which, by simply mounting the single-unit video-camera recorder on the station, the connection therebetween can be achieved. Further, by spatial transmission through the use of infrared light, video and audio signals can be transmitted through the space between the single-unit video-camera recorder and station at a distance as long as several meters. Also, the present invention can be applied to personal computers or multimedia equipment.

BRIEF DESCRIPTION OF THE DRAWINGS

The present invention will be more apparent from the following detailed description, when taken in conjunction with the accompanying drawings, in which:

FIG. 2 is a perspective view showing an example of a single-unit video camera-recorder and a station with the apparatus for transmitting a lightwave signal of FIG. 1 applied thereto;

FIG. 16 is a perspective view showing an example of a single-unit video-camera recorder and a personal computer with the apparatus for lightwave signal transmission of FIG. 1 applied thereto.

DETAILED DESCRIPTION OF THE PREFERRED EMBODIMENTS

An embodiment of the present invention will be described below with reference to the accompanying drawings.

Figure 1:
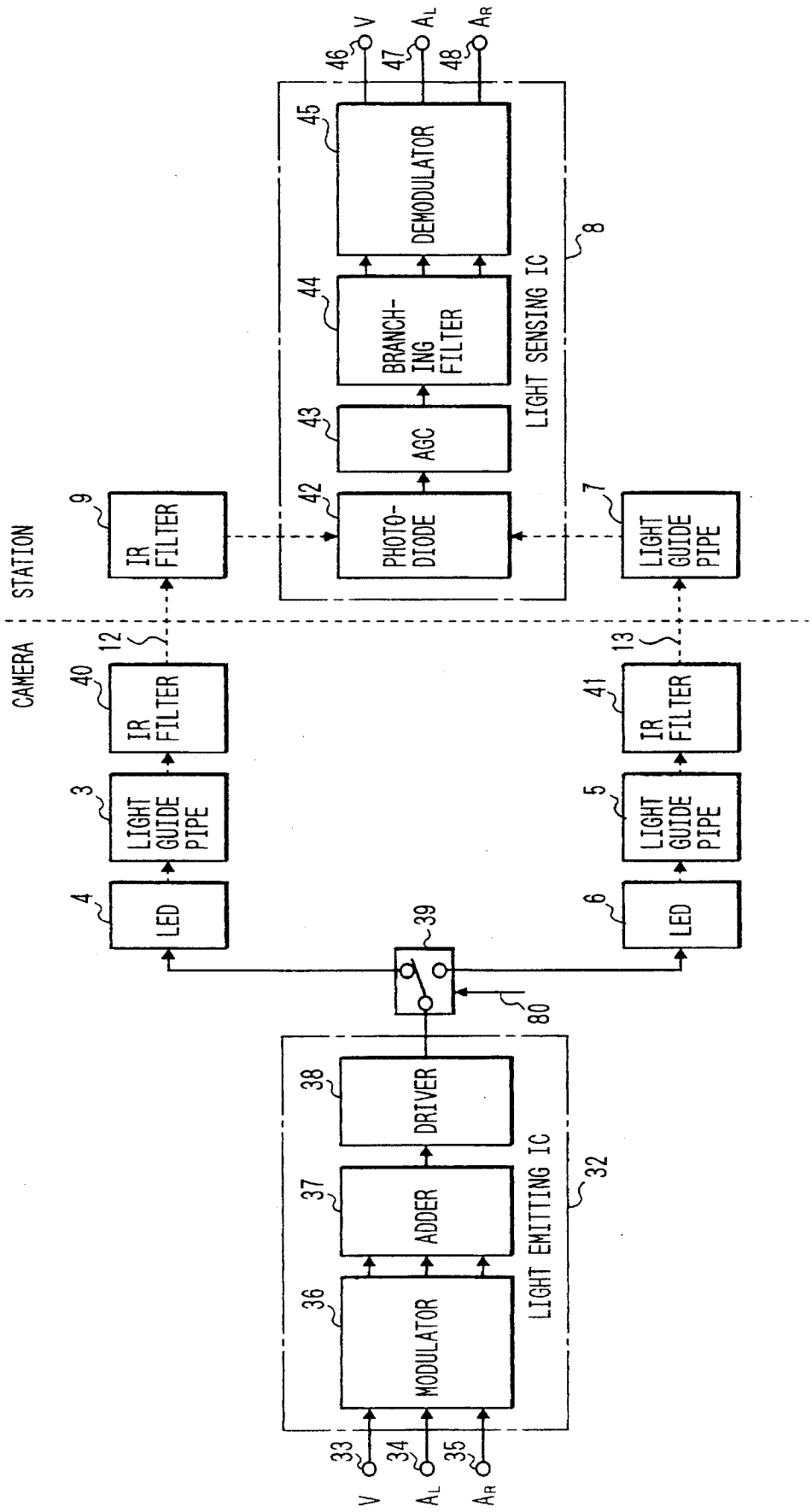
FIG. 1 is a block diagram showing an apparatus for transmitting a lightwave signal as an embodiment of the invention.
Figure 3:
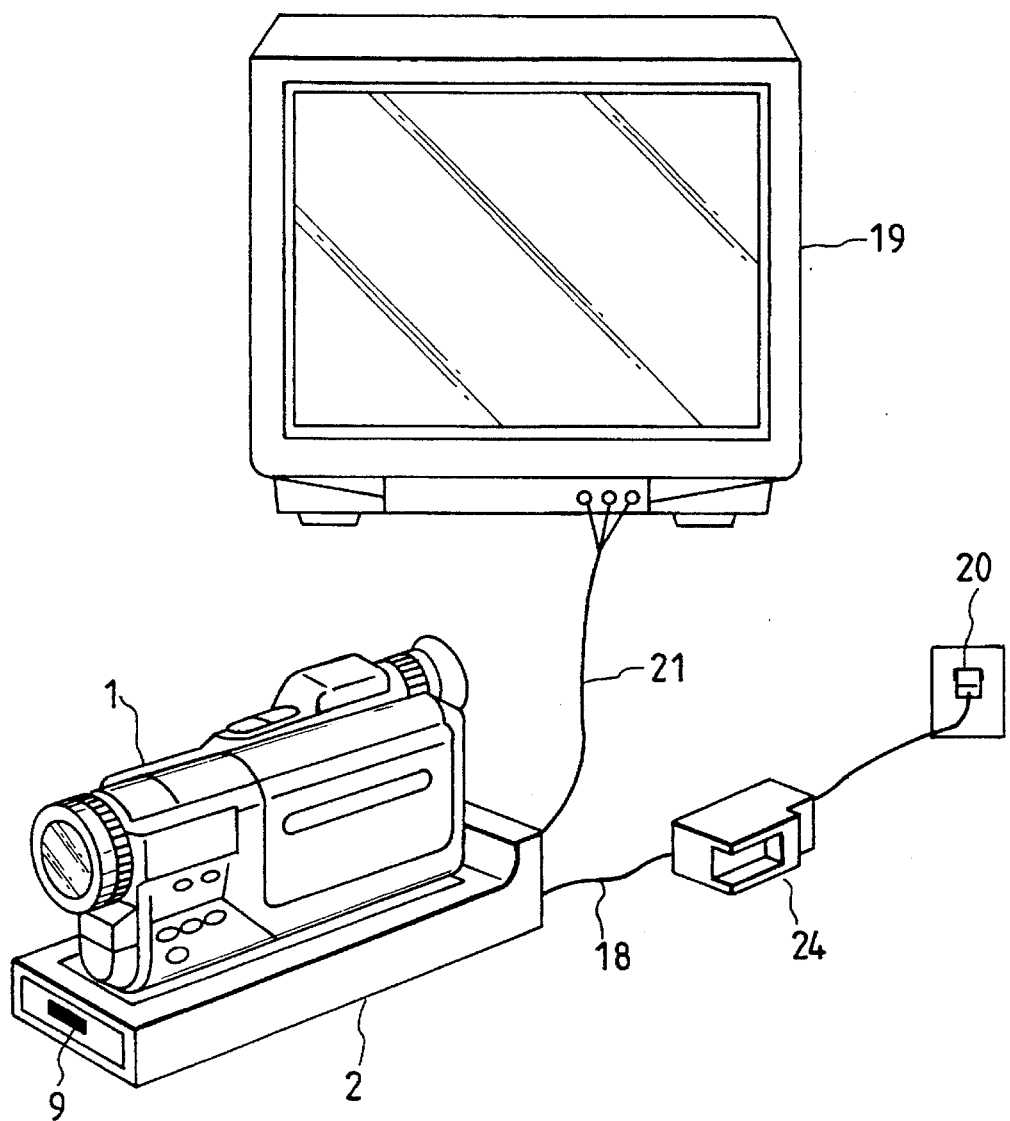
FIG. 3 is a perspective view showing a case where the single-unit video camera-recorder of FIG. 2 is mounted on the station for near-by transmission.
Figure 4:
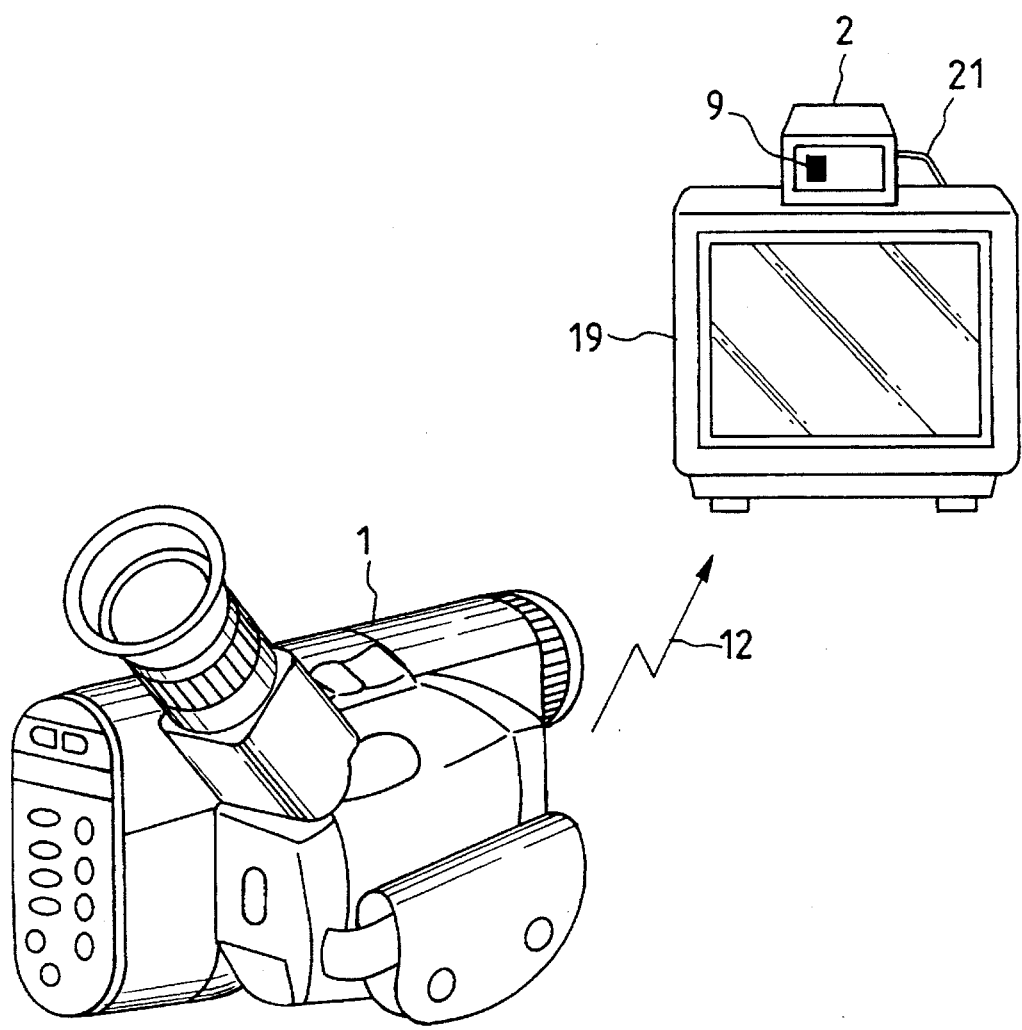
FIG. 4 is a perspective view showing a case where the single-unit video-camera recorder of FIG. 2 is positioned several meters apart from the station for spatial transmission.

FIG. 1 is a block diagram showing an apparatus for transmitting a lightwave signal as an embodiment of the present invention, FIG. 2 is a perspective view showing an example of a single-unit video camera-recorder and a station using the apparatus for transmitting a lightwave signal of FIG. 1, FIG. 3 is a perspective view showing a case for near-by transmission where the single-unit video camera-recorder in FIG. 2 is mounted on the station, and FIG. 4 is a perspective view showing a case for spatial transmission where the single-unit video camera-recorder of FIG. 2 is used several meters apart from the station.

Before describing the present invention with reference to FIG. 1, description will first be made with reference to FIG. 2 to FIG. 4. Referring to FIG. 2, reference numeral 1 denotes a single-unit video camera-recorder (hereinafter referred to as "video camera"), 2 denotes a station, 3 denotes a light guiding pipe for spatial transmission, 4 denotes an light emitting diode (LED) for spatial transmission, 5 denotes a light guiding pipe for near-by transmission, 6 denotes an LED for near-by transmission, 7 denotes a light guiding pipe on the side of the station for near-by transmission, 8 denotes a light sensing (IC), 9 denotes an infrared light (IR) filter, 10 and 11 denote connection terminals for power supply, 12 denotes infrared light for the spatial transmission, 13 denotes infrared light for the near-by transmission, and 18 denotes a power supply cable. Referring to FIG. 3 and FIG. 4, reference numeral 19 denotes a television receiver (TV), 20 denotes an alternating current (AC) plug, 21 denotes an AV cable, and 24 denotes an AC adapter.

In the present embodiment, the transmission of a video signal, an audio signal, a control signal and digital data between the video camera 1 and the station 2 is performed through the use of infrared light as shown in FIG. 3 and as shown in FIG. 4.

When the video camera 1 is used while mounted on the station 2 for near-by transmission as shown in FIG. 3, the infrared light 13 output from the bottom face of the video camera 1 is input to the light sensing IC 8 from the top face of the station 2. The infrared light 13 after being converted to an electric signal, is supplied to the TV 19 through the AV cable 21. Hence, by simply mounting the video camera 1 on the station 2, the connection of signals to the TV 19 is achieved. Here, it is presumed that the light sensing IC 8 has an on-chip photodiode (PD). Further, the station 2 is supplied with direct current (DC) power from the AC adapter 24 through the power supply cable 18 and the video camera 1 and the station 2 are connected by power supply connection terminals 10 and 11. Accordingly, it is possible to drive the video camera 1 by the DC power from the AC adapter 24.

On the other hand, when the video camera 1 is used several meters apart from the station 2 for spatial transmission as shown in FIG. 4, the infrared light 12 output from the front face of the video camera 1 is input to the light sensing IC 8 on the front face of the station 2. The infrared light 12, after being converted to an electric signal, is supplied to the TV 19 through the AV cable 21 the same as in the above case. In this case, the video camera 1 is driven by battery permitting the video camera 1 to be used at an infinite number of locations.

Now, description with reference to FIG. 1 will be given. In FIG. 1, corresponding component parts to those in FIG. 2 are denoted by corresponding reference numerals. Further, reference numeral 32 denotes a light emitting IC, 33 denotes a video signal input terminal, 34 and 35 denote audio signal input terminals, 36 denotes a modulator, 37 denotes an adder, 38 denotes a driver, 39 denotes a switch circuit, 40 and 41 denote IR filters, 42 denotes a PD, 43 denotes an auto gain control (AGC) circuit, 44 denotes a branching filter, 45 denotes a demodulator, 46 denotes a video signal output terminal, and 47 and 48 denote audio signal output terminals.

While, as described above, there are two types of use of the present invention, near-by transmission and spatial transmission the spatial transmission will first be described in detail.

Referring to FIG. 1, the video and audio signals from the video camera 1 are input to the light emitting IC 32 through the video and audio signal input terminals 33 to 35. The input video and audio signals are FM-modulated by the modulator 36, frequency multiplexed by the adder 37, and output through the driver 38. The output signal from the light emitting IC 32, in the case of spatial transmission, is switched to the side of the LED 4 by the switch circuit 39 and supplied to the LED 4. The LED 4 converts the output signal from the light emitting IC 32 into infrared light. The switch circuit 39 switches to either LED 4 for spatial transmission in response to an indication 80 indicating that the video camera 1 is not mounted in the station 2 thereby implementing for spatial transmission.

Figure 5:
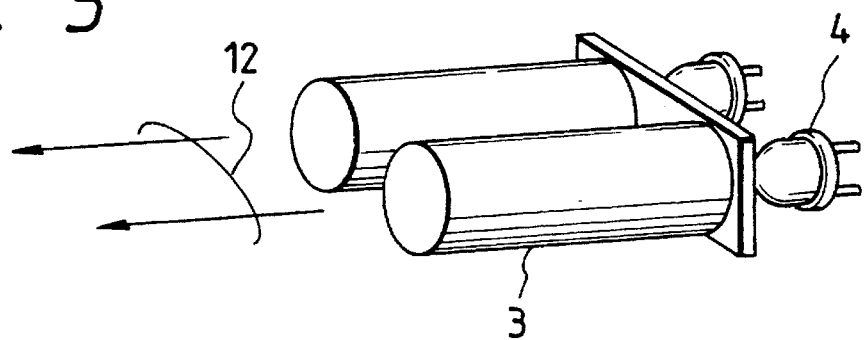
FIG. 5 is a perspective view showing a light guiding pipe 3 and an LED 4 in FIG. 2.

When LED 4 is recessed from the front face of the video camera 1 due to structural restrictions, there arises a problem that the angle of emission of the infrared light 12 from the LED 4 is narrowed because of interference with the outer case of the video camera 1. This problem can be solved by providing a light guiding pipe 3 in front of the LED 4 as shown in FIG. 5 so that the infrared light 12 is guided to the front of the video camera 1. FIG. 5 is a perspective view showing the light guiding pipe 3 and the LED 4 in FIG. 2.

The diameter of the light guiding pipe 3 must be determined taking the angle of radiation into consideration so that all of the infrared light 12 is introduced into it. Further, the diameter of the light guiding pipe 3 must be uniform because, if it is varied, the infrared light 12 is thereby reflected and loss in light intensity occurs. Also, it is possible to prolong the reachable distance of the infrared light by forming the end of the light guiding pipe 3 into a lens.

In FIG. 1, the infrared light 12 from the video camera 1 is input to the light sensing IC 8 through the IR filter 9 of the station 2. Since this light sensing IC 8 has an on-chip PD 42, the infrared light 12 is thereby converted into an electric signal, and the electric signal, after being controlled in the AGC circuit 43 so as to have virtually uniform signal amplitude, is separated into each of the frequency components by the branching filter 44. Then, the separated signals are FM-demodulated by the demodulator 45 and output from the video signal output terminal 46 and audio signal output terminals 47 and 48 as video and audio signals. The above IR filter 9 is for attenuating visible light and provided for preventing noises from being produced by indoor fluorescent lamps and the like.

Now, near-by transmission will be described in detail.

In the case of near-by transmission, the output signal of the light emitting IC 32 is switched to the side of the LED 6 by the switch circuit 39 based on indication 80 that the camera is mounted in the station 2 for near-by transmission.

Figure 6:
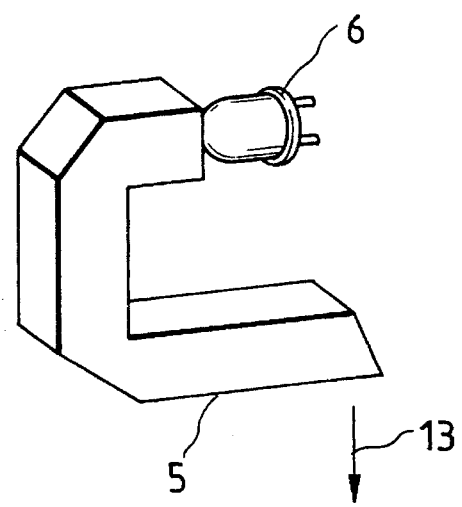
FIG. 6 is a perspective view showing a light guiding pipe 5 and an LED 6 in FIG. 2.

Thus, the output signal of the light emitting IC 32 is supplied to the LED 6 and converted to infrared light 13 by the LED 6. In this case, the infrared light 13 is output from the bottom face of the video camera 1. If it is structurally impossible to arrange the LED 6 to turn down, the direction of the infrared light 13 can be turned by using a light guiding pipe 5 as shown in FIG. 6. FIG. 6 is a perspective view showing the light guiding pipe 5 and the LED 6 in FIG. 2.

Figure 7:
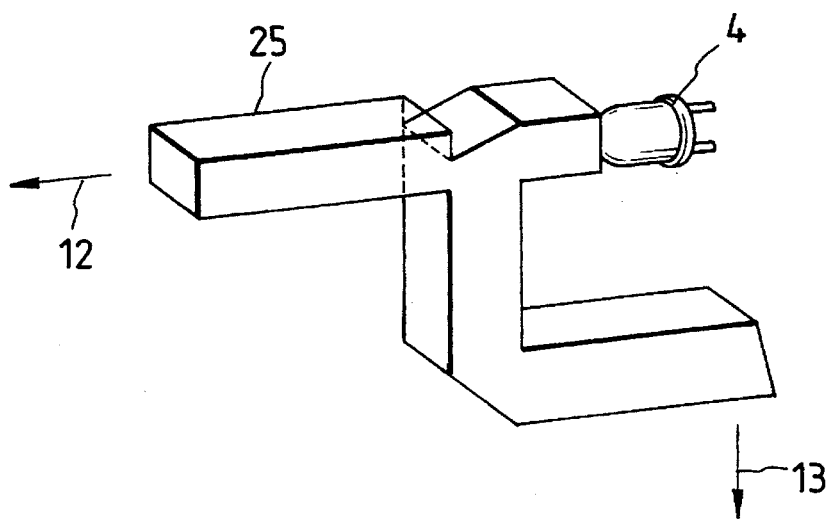
FIG. 7 is a perspective view showing a branch light guiding pipe used in place of the light guiding pipes in Fig. 5 and FIG. 6.

FIG. 7 is a perspective view showing a branch light guiding pipe used in place of the light guiding pipes in FIG. 5 and FIG. 6. By using a branch light guiding pipe 25, which is provided with a notch and in which the light guiding pipe for spatial transmission and the light guiding pipe for near-by transmission are integrally formed as shown in FIG. 7, it becomes possible to make an LED usable for both spatial transmission and near-by transmission.

Figure 8:
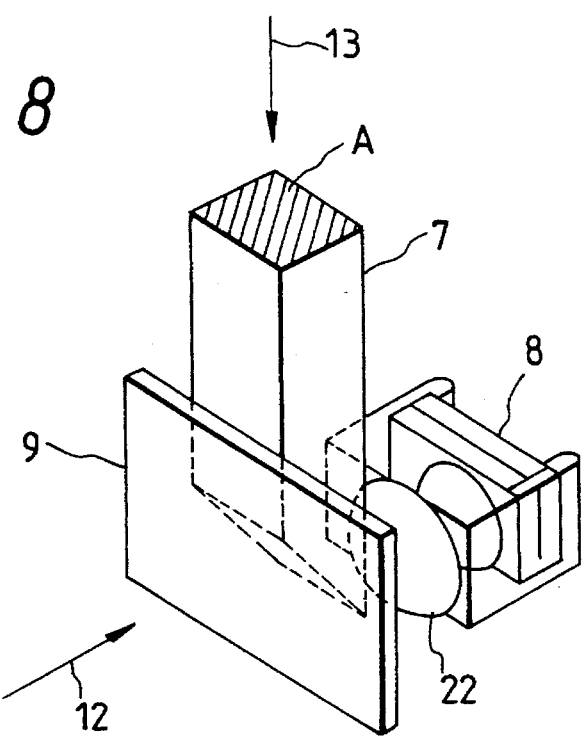
FIG. 8 is a perspective view showing a light guiding pipe 7, a light sensing IC 8, and an IR filter 9 in FIG. 2.

The infrared light 13 from the video camera 1 is input to the station 2 from its top face. Then, by using the light guiding pipe 7 as shown in FIG. 8 to guide the infrared light 13 into the light sensing IC 8, the light sensing IC 8 can be used for both spatial transmission and near-by transmission. FIG. 8 is a perspective view showing the light guiding pipe 7, the light sensing IC 8, and the IR filter 9 in FIG. 2. Reference numeral 22 in FIG. 8 denotes a lens.

By offsetting the light guiding pipe 7 such that it overlaps the lens 22 of the light sensing IC 8, the light guiding pipe 7 does not get in the way of the light at the time of spatial transmission. Further, by widening the area A of the inlet portion of the infrared light of the light guiding pipe 7 as much as possible, an S/N deterioration of the video and audio signals due to a positional error produced when the video camera 1 is mounted on the station 2 can be prevented.

When the distance between the light emitting side and the light sensing side becomes short in signal transmission through the use of infrared light, there arises a problem that the signal saturates and the S/N ratio of the video and audio signals is thereby deteriorated. Therefore, at the time of near-by transmission, it becomes necessary to attenuate the light quantity of the infrared light 13 so that the distance between the transmitting and receiving sides may practically be prolonged. Meanwhile, if such a light guiding pipe as shown in FIG. 6 to FIG. 8 is used, the light quantity of the infrared light attenuates because the infrared light leaks out of the transmission path. Accordingly, at the time of near-by transmission, the problem of S/N deterioration due to the excessive light quantity can be solved by using such a light guiding pipe as shown in FIG. 6 to FIG. 8 to thereby attenuate the infrared light 13. One method of attenuating the light quantity of infrared light in a light guiding pipe is to bend the light guiding pipe so that portions reflecting infrared light are provided. Another method is to form the sectional area of the outlet portion of the infrared light of the light guiding pipe to be smaller than that at the inlet portion of the infrared light.

In FIG. 1, the infrared light 13 from the video camera 1 is input to the light sensing IC 8 through the light guiding pipe 7 of the station 2 for near-by transmission as described above. The infrared light 13 input to the light sensing IC 8 is processed in the same way as in spatial transmission and, finally, output from the video signal output terminal 46 and the audio signal output terminals 47 and 48 as video and audio signals.

The infrared light 12 spatially transmitted from the video camera 1 can be input to the station 2 from a plurality of different portions thereof (for example, if the IR filter 9 is provided not only in the front face but also in the side face of the station 2) if the light sensing IC 8 is arranged to be movable such that one single light sensing IC 8 can sense the infrared light 12 introduced from any desired portion. Such a construction permits orientation of the station 2 in a desired direction with respect to the video camera 1.

Cases where the light sensing IC 8 is arranged to be movable as described above will be explained below with reference to FIG. 9 and FIG. 10.

Figure 9:
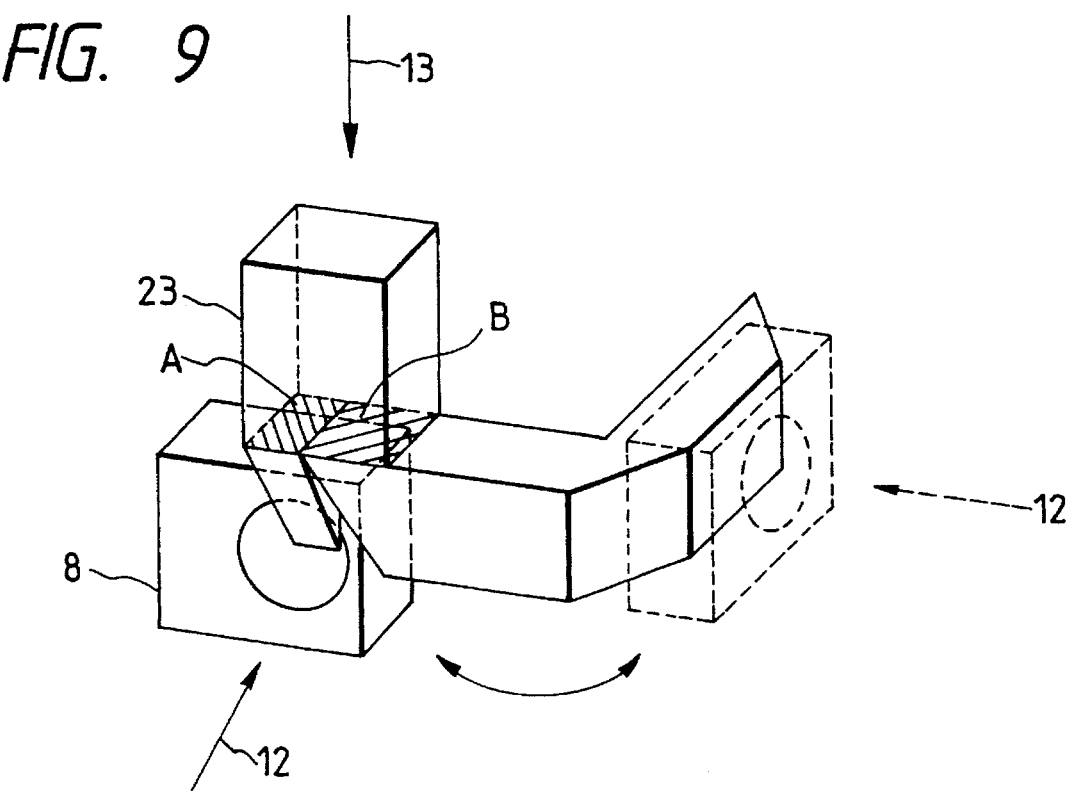
FIG. 9 is a perspective view showing a light guiding pipe to be used in a case where the light sensing IC 8 in FIG. 2 is arranged for rotational movement in the horizontal direction.

FIG. 9 is a perspective view showing the light guiding pipe when the light sensing IC 8 is arranged for rotational movement in the horizontal direction. In FIG. 9, reference numeral 23 denotes a branch light guiding pipe.

When the light sensing IC 8 is arranged to be rotationally movable in the horizontal direction and usable only in either of predetermined two positions, then, by forming the light guiding pipe on the station side used in the near-by transmission into a branch structure, as the branch light guiding pipe 23 shown in FIG. 9, the light sensing IC 8 can be made usable for both spatial transmission and near-by transmission. In this case, however, it is necessary to determine the ratio between the sectional areas A and B so that the attenuation of the infrared light becomes virtually constant in whichever position the light sensing IC 8 is placed. Further, if the light guiding pipe in FIG. 9 is branched in several directions, the number of positions where the light sensing IC 8 is used can be increased.

Figure 10:
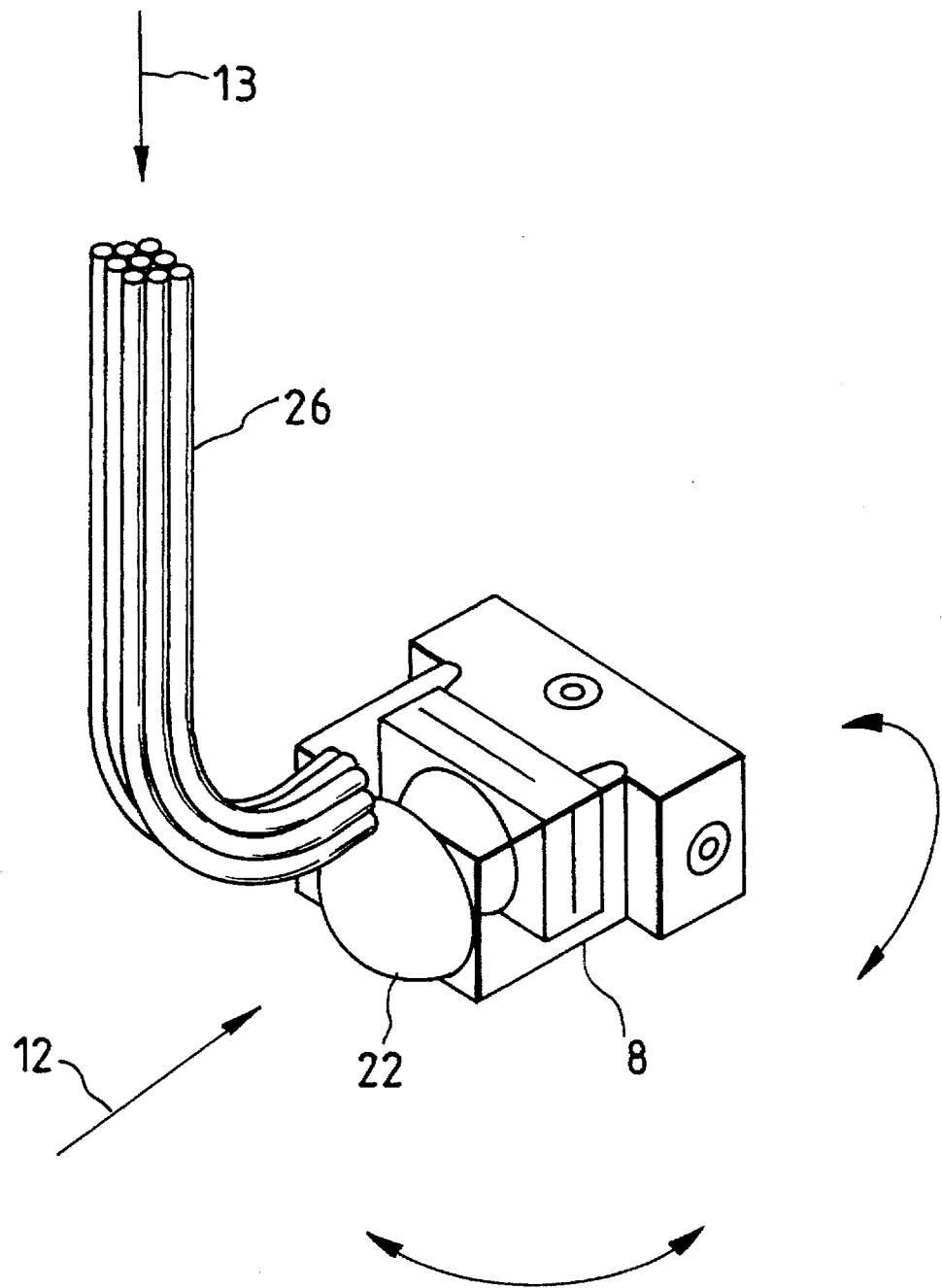
FIG. 10 is a perspective view showing optical fibers to be used in a case where the light sensing IC 8 in FIG. 2 is arranged for rotational movement in the horizontal and vertical directions.

FIG. 10 is a perspective view showing optical fibers to be used in the case where the light sensing IC 8 is arranged for rotational movement in both horizontal and vertical directions. In FIG. 10, reference numeral 26 denotes the optical fibers.

When the light sensing IC 8 is arranged for rotational movement in both horizontal and vertical directions, the optical fibers 26 are used in place of the light guiding pipe, as shown in FIG. 10. In this case, by bundling a plurality of plastic optical fibers together, a minimum infrared light quantity can be secured. Since the light sensing IC 8 can be freely moved vertically and horizontally, operability of the video camera 1 and station 2 is improved.

By using the light guiding pipe and optical fibers as described above, the degree of freedom in the design is increased and it becomes possible to use the LED, PD, light sensing IC, etc. for both spatial transmission and near-by transmission of infrared light.

However, since infrared light attenuates in the light guiding pipe, when it is required to reduce the attenuation of the infrared light, especially when spatial transmission is performed, the material of the light guiding pipe must be carefully chosen. Further, measures must be taken as to finish the inner peripheral surface into a mirror surface to prevent occurrence of irregular reflection of infrared light to thereby minimize the attenuation of the infrared light within the light guiding pipe. On the other hand, in near-by transmission, signal transmission with the S/N ratio of the video and audio signals kept practically at a maximum value can be achieved by maintaining the attenuation of the infrared light within the light guiding pipe at a suitable level. As an example of the materials of the light guiding pipe, acrylic resin (PMMA) can be mentioned.

Now, the measures to expand the angle of reception of infrared light by a light sensing IC 8 will be described with reference to FIG. 11 and FIG. 12. Both FIG. 11 and FIG. 12 are diagrams explanatory of the apparatus to expand the angle of reception of infrared light by a light sensing IC 8.

When the spatial transmission of infrared light is performed, the angle of emission of infrared light, together with its reachable distance, constitutes an important factor for usability. Accordingly, in the above described example, the expansion of the angle of reception of the infrared light by the light sensing IC 8 was chiefly achieved by the lens 22 provided in front of the PD 42. However, when a lens is used for expanding the angle of reception, the effect generally depends on the size (aperture) of the provided lens and a large lens (a lens having a large aperture) becomes necessary to obtain a wide angle of reception. Hence, in a system restricted in size, the expansion of the angle of reception comes to be restricted.

Figure 11:
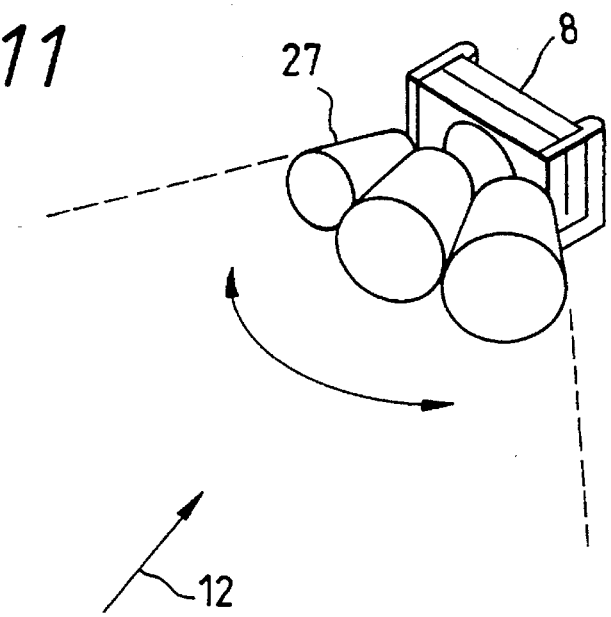
FIG. 11 is a diagram explanatory of apparatus for expanding the angle of reception of infrared light by the light sensing IC 8 in FIG. 2.

The problem as above can be solved by using horizontally arranged light guiding pipes 27 expanding the angle of reception of the infrared light as shown in FIG. 11. In FIG. 11, there are horizontally arranged the light guiding pipes 27 in front of the light sensing IC 8. Further, the end of the light guiding pipe 27 is formed into a lens to expand the angle of reception. The angle of reception in the vertical direction can also be expanded by increasing the number of the light guiding pipes.

Figure 12:
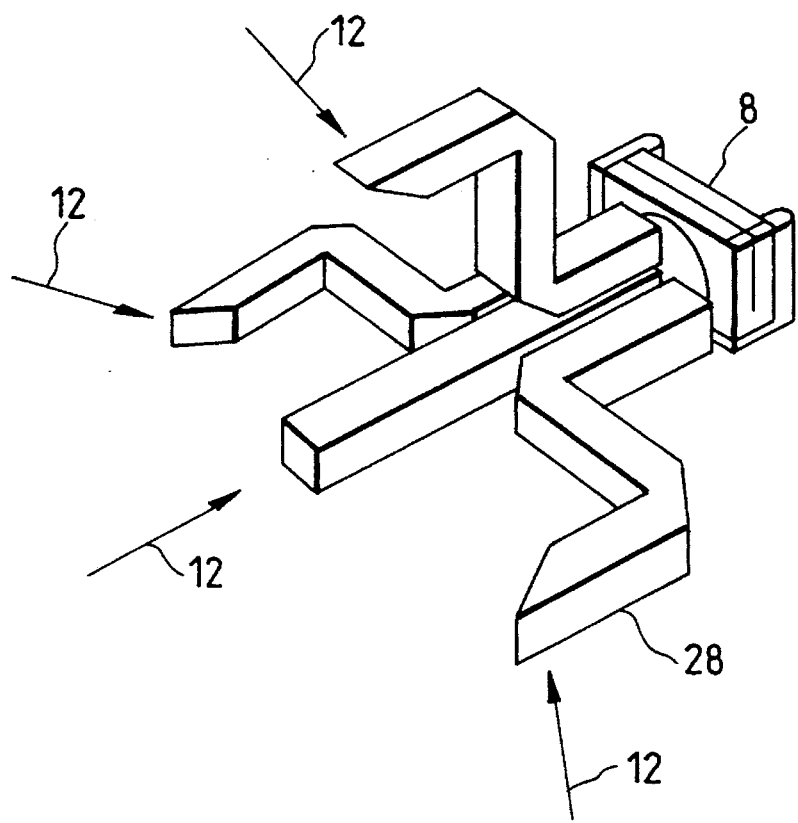
FIG. 12 is a diagram explanatory of apparatus for expanding the angle of reception of infrared light by the light sensing IC 8 in FIG. 2.

By forming light guiding pipes 28 bent at several places as shown in FIG. 12, it becomes possible to receive infrared light from other directions than from the front, and also in this case, one single light sensing IC 8 can be used for all of the light guiding pipes.

While there have been described methods to expand the angle of reception of infrared light by the light sensing IC 8, it is necessary also in such cases to consider the sectional area of the light guiding pipe, the number of bends of the light guiding pipe, the material of the light guiding pipe, and the like to minimize the attenuation of the infrared light within the light guiding pipe.

The on-chip PD 42 in the light sensing IC 8 is divided into a plurality of divisions and a selection circuit is provided such that the light guiding pipe, as well as the PD, providing a maximum light quantity of the infrared light is automatically selected.

Figure 13:
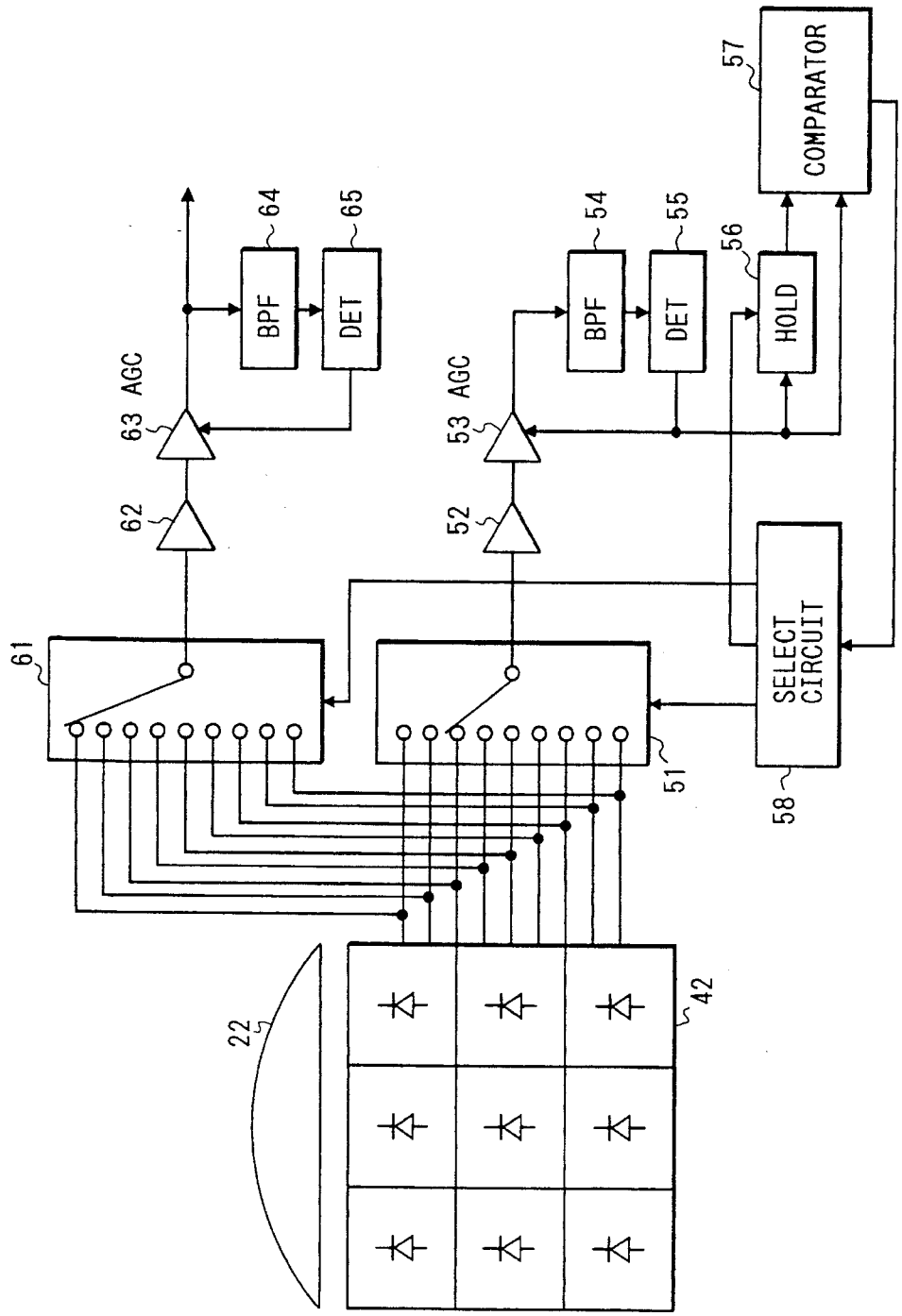
FIG. 13 is a block diagram showing an example of a structure of a selection circuit of divisions of the on-chip PD in the light sensing IC 8 in FIG. 2.
Figure 14:
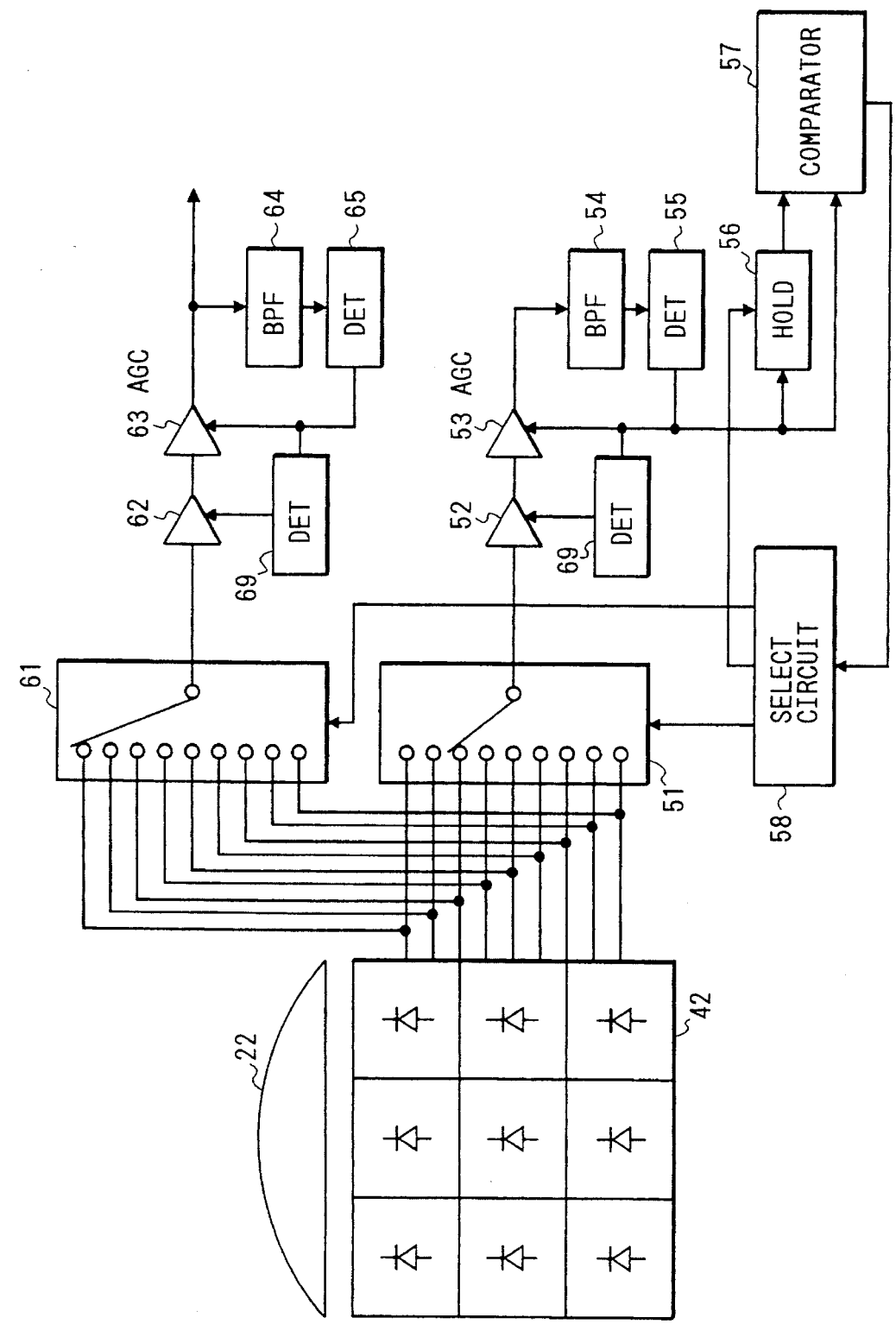
FIG. 14 is a block diagram showing an example of structure of a selection circuit of divisions of the on-chip PD in the light sensing IC 8 in FIG. 2.
Figure 15A:
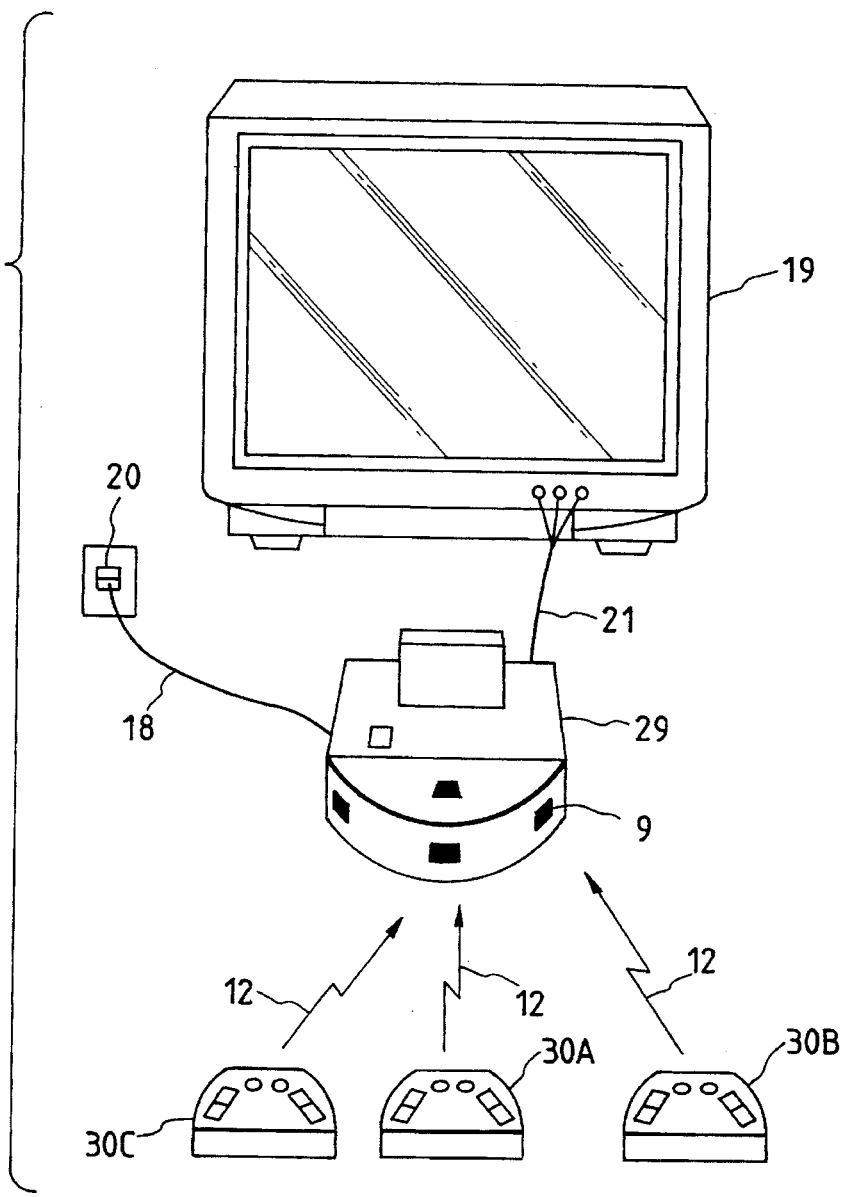
Figure 15B:
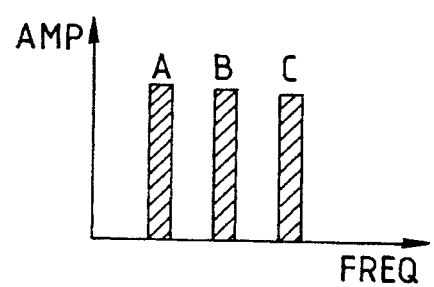

Now, a particular selection circuit of the divided on-chip PD in the light sensing IC 8 will be described with reference to FIG. 13 and FIG. 14. Each of FIG. 13 and FIG. 14 is a block diagram showing an example of the structure of a selection circuit of a division of the on-chip PD in the light sensing IC 8. In FIG. 13 and FIG. 14, reference numerals 51 and 61 denote switch circuits, 52 and 62 denote preamplifiers, 53 and 63 denote AGC circuits, 54 and 64 denote bandpass filters (BPF), 55, 59, 65, and 69 denote detector circuits (DET), 56 denotes a hold circuit (Hold), 57 denotes a comparator, and 58 denotes a select circuit.

In the select circuit of FIG. 13, infrared light converged by the lens 22 is converted by the PD 42 into electric signals and input to the switch circuits 51 and 61. Contacts of the switch circuit 51 are sequentially switched at regular intervals by the select circuit 58. The switch 61 is adapted to be switched such that its contact selects at all times the output signal of the one of the nine divided PDs which provides a largest infrared light quantity.

The output signal of the switch circuit 51, after being passed through the preamplifier 52 and the AGC circuit 53, is subjected to restriction in a particular band through the BPF 54 and to detection of its signal level in the detector circuit 55. In the AGC circuit 53, it is subjected to a gain adjustment according to the result of detection in the detector circuit 55 so that its signal level becomes virtually constant.

The output signal of the switch circuit 61, also, after being passed through the preamplifier 62 and the AGC circuit 63, is subjected to restriction in a particular band through the BPF 64 and to detection of its signal level in the detector circuit 65. In the AGC circuit 63, it is subjected to a gain adjustment according to the result of detection in the detector circuit 65 so that its signal level becomes virtually constant, and then it is supplied to the branching filter 44 in FIG. 1.

Meanwhile, the hold circuit 56, the comparator 57, and the like operate as follows. When the above described nine divisions of PD are denoted by A, B, . . . , I, the contacts of the switch circuit 51 are sequentially switched at regular intervals by the select circuit 58 so that the output of A, the output of B, . . . , the output of I are selected one after another. Supposing now, for example, that the output obtained by having the output of A detected by the detector circuit 55 (hereinafter called the detected output of A) is held by the hold circuit 56, and the switch circuit 51 is then switched by the select circuit 58 to select the output of B (hereinafter called the detected output of B). Then, the detected output of A and the detected output of B are compared in magnitude and the result of the comparison is input to the select circuit 58. If the detected output of A is larger than or equal to the detected output of B, the select circuit 58 controls the hold circuit 56 to keep holding the detected output of A.

Then, the switch circuit 51 is switched by the select circuit 58 to select the output of C (hereinafter called the detected output of C). The detected output of A and the detected output of C are compared in magnitude by the comparator 57 and the result of comparison is input to the select circuit 58. If the detected output of A is smaller than the detected output of C, the select circuit 58 controls the hold circuit 56 to hold the detected output of C.

Through repetition of the above described operation, the hold circuit 56 comes to hold the maximum detected output. Then, the select circuit 58 determines by which of the PD A to I the output held in the hold circuit 56 is detected, according to the results of comparison by the comparator 57, and thus, it controls, as described above, the switch circuit 61 to select the output signal of the one of the PD A to I which provides the largest light quantity of the infrared light. In this way, the PD providing the largest light quantity of the infrared light can be automatically selected.

In the circuit of FIG. 14, the output signal of the detector circuit 55 is supplied to the detector circuit 59 to change the gain in the preamplifier 52 and the output signal of the detector circuit 65 is supplied to the detector circuit 69 to change the gain in the preamplifier 62. Thereby, the gains in the preamplifiers 52 and 62 can be changed according to the transmitted distance at the time of spatial transmission of the infrared light and, hence, the S/N deterioration due to excessive infrared light quantity can be prevented. Here, two steps or so are sufficient as the steps of the changes in gain in the preamplifiers 52 and 62.

Below are descriptions of examples of use of the apparatus of the present invention other than that for the video camera and the station shown in FIG. 2 with reference to FIGS. 15A and 15B to FIG. 17.

Figure 15A:
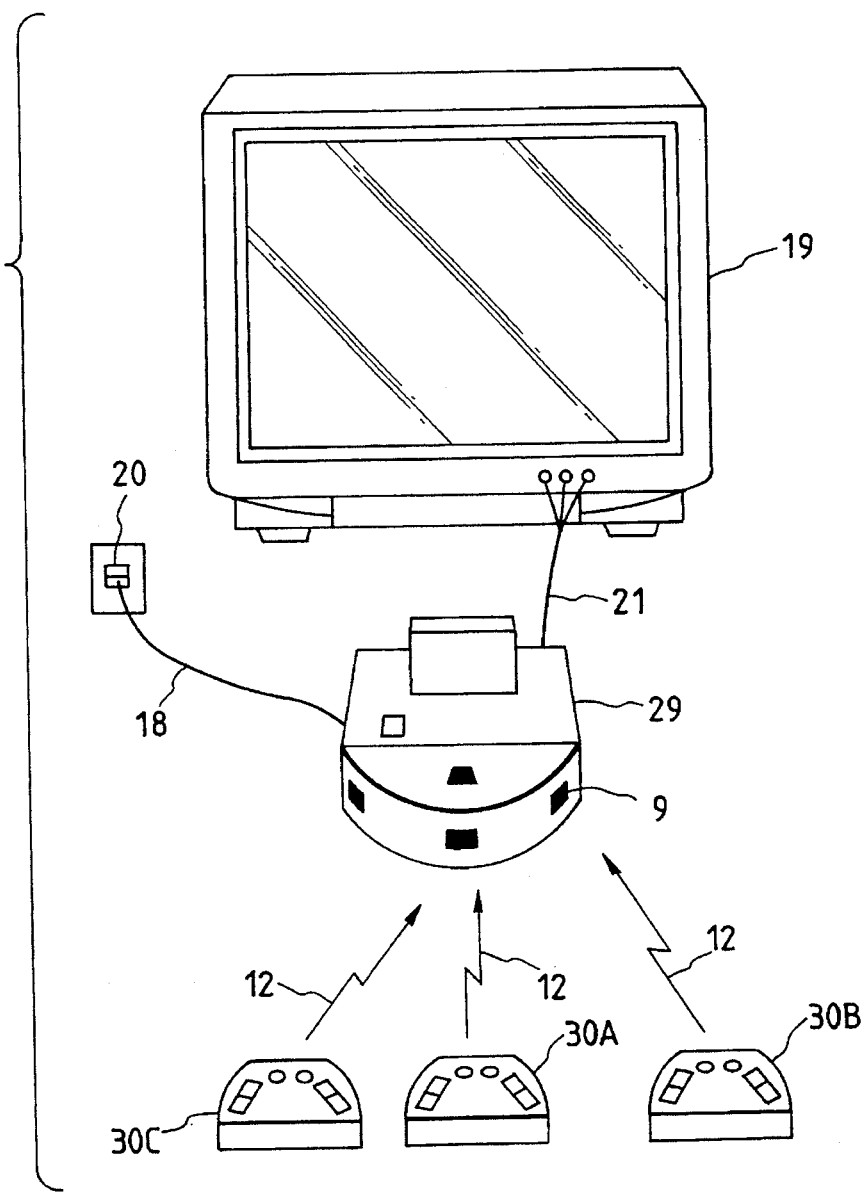
FIGS. 15A and 15B is a perspective view showing an example of a home game machine and control pads with the apparatus for lightwave signal transmission of FIG. 1 applied thereto and a graph showing the different frequencies at which the control pads operate.
Figure 15B:
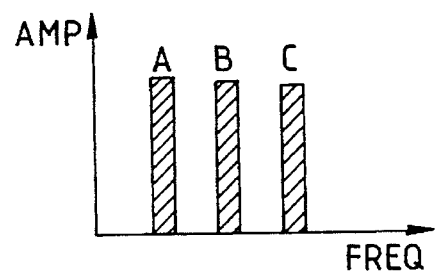

FIGS. 15A and 15B is a perspective view of a home game machine and control pads with the apparatus for lightwave signal transmission of FIG. 1 applied thereto and a graph illustrating how the control pads are differentiated by frequency. Although game control signals are transmitted instead of video and other signals in this example, the signals transmitted may be video and other signals. In FIG. 15A, reference numeral 29 denotes a game machine and 30A–30C denote control pads.

The game control signals from the control pads 30A–30C are transmitted to the body of the game machine 29 through the space therebetween in the form of infrared light 12. In such a case, even if a plurality of light sensing portions (IR filters) 9 of infrared light are provided by the use of a light guiding pipe as shown in FIG. 12, one single light sensing IC can be used for all of them. By providing a plurality of sensing portions of infrared light, the angle of reception of infrared light is expanded and, hence, usability is greatly improved. Further, the control pads 30A–30C can be differentiated from each other for plural game participants by setting the control pads 30A–30C to operate at different frequencies as illustrated in the graph of FIG. 15B. Bandpass filters may be used to separate the respective signals of the control pads 30A–30C from infrared light 12.

FIG. 16 is a perspective view showing an example of a video camera and a personal computer to which the apparatus for signal lightwave transmission of FIG. 1 is applied. In FIG. 16, reference numeral 31 denotes a personal computer body. Video and audio signals from the video camera 1 are transmitted to the personal computer 31 through the space therebetween in the form of infrared light 12. While, in this case, a light sensing portion 9 of the infrared light 12 is provided on the personal computer 31, by providing a plurality of them as shown in FIG. 16, the angle of reception of the infrared light is expanded and usability is improved. By providing a light guiding pipe in the personal computer 31, one single light sensing IC can be used for all of them. As the video signal inputting apparatus to the personal computer 31 other than the video camera, an electronic still camera, an image scanner, and the like may be used by apparatus of spatial transmission of infrared light.

Figure 17:
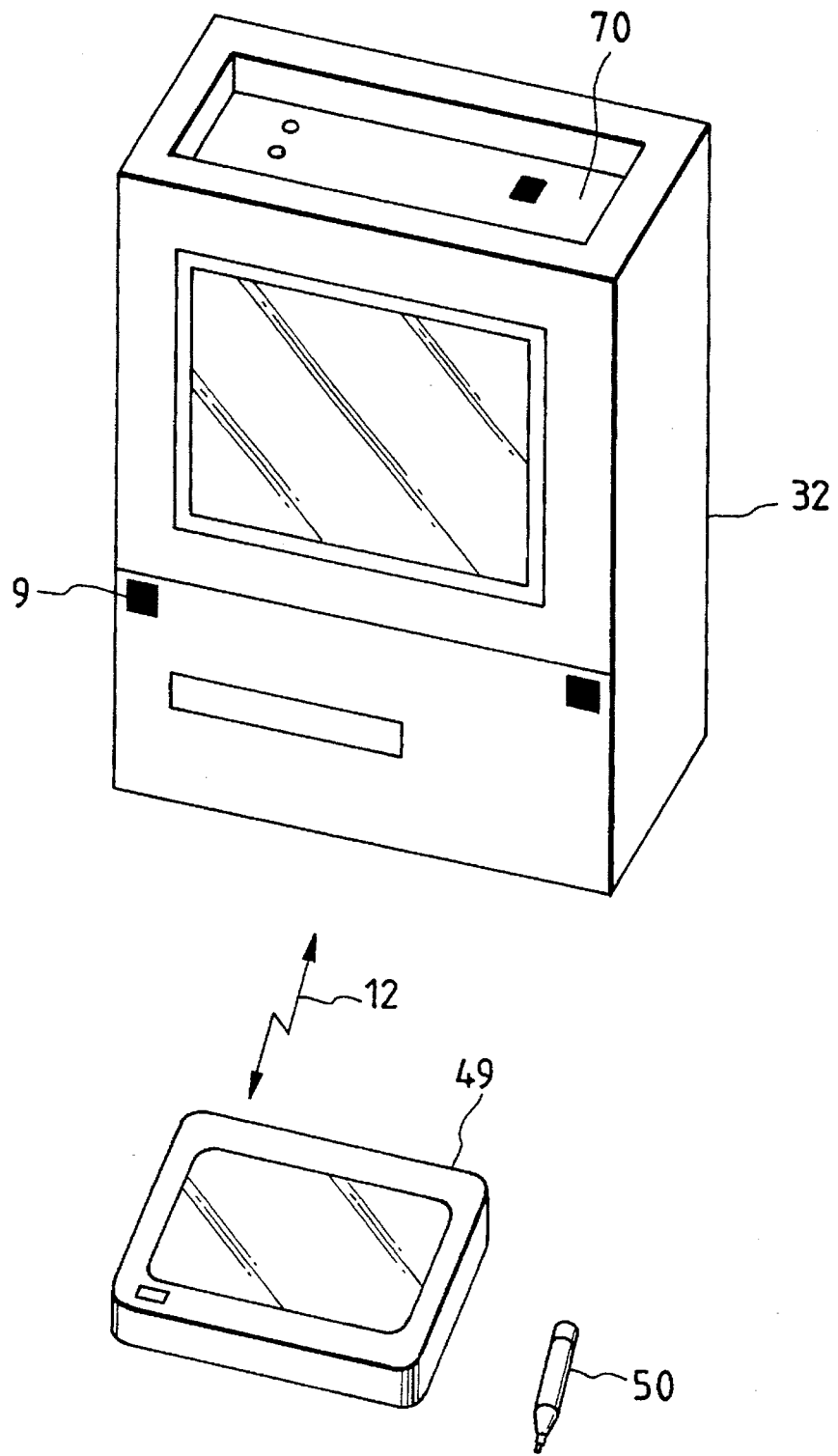
FIG. 17 is a perspective view showing an example of a pen-input personal computer and a desk-top personal computer with the apparatus for lightwave signal transmission of FIG. 1 applied thereto.

FIG. 17 is a perspective view showing an example of a pen-input personal computer and a desk-top personal computer to which the apparatus for lightwave signal transmission of FIG. 1 is applied. While digital data is transmitted instead of a video signal and the like in this example, the signal transmitted may be a video signal or the like. In FIG. 17, reference numeral 32 denotes a desk-top personal computer, 49 denotes a pen-input personal computer, 50 denotes an inputting pen for the personal computer, and 70 denotes a station portion which operates similar to station 2 shown in FIG. 2.

In this case, exchange of digital data can be achieved between the pen-input personal computer 49 and the desk-top personal computer 32 bidirectionally through spatial transmission of infrared light. Further, data transmission can be made both by placing the pen-input personal computer 49 a distance apart from the desk top personal computer 32 as shown in FIG. 17 and by mounting the pen-input personal computer 49 on the station portion 70 provided in the top face of the desk-top personal computer 32. By providing a light guiding pipe in the desk-top personal computer 32, one single light sensing IC can be used for a plurality of light sensing portions.

As described above, even in game machines, or personal computers, multimedia apparatuses, and the like providing a light guiding pipe permits the angle of reception of the infrared light to be expanded. Therefore, when using such an apparatus, the need for transmitting the infrared light by taking careful aim at the light sensing portion can be eliminated and usability is greatly improved. Even if a plurality of the light sensing portions are provided, one single light sensing IC can be used for all of them, and therefore cost increase due to an increase in number of light sensing ICs and PDs can be avoided.

In the present invention, as described in the foregoing, by carrying out spatial transmission through the use of infrared light representing video, audio, control, or digital data signals between a transmitting unit and a receiving unit, contact-less linking between the transmitting unit and the receiving unit can be achieved and usability improved.

By the use of light guides the degree of freedom in designing the apparatus of the present invention can be increased and one single LED, PD, light sensing IC, and the like can be used for both near-by transmission and spatial transmission of the optical signal. While, in the near-by transmission, there arises a problem of the signal becoming saturated and causing an S/N deterioration, by using the light guide to attenuate the optical signal, the problem of S/N deterioration due to excessive light quantity can be solved. Further, by bringing the attenuation of the optical signal within the light guide to a suitable level, signal transmission through near-by transmission with the S/N ratio maintained at a maximum level can be achieved.

Further, by the use of a light guide it also becomes possible to expand the angle of reception of infrared light by the light sensing IC thereby eliminating the need for carefully aiming the optical signal at the light sensing portion in spatial transmission eliminating such requirements improves the usability of the apparatus. Further, even if a plurality of light sensing portions are provided, one single light sensing IC can be used for all of them and, therefore, cost increase due to an increase in number of the light sensing ICs and PDs can be avoided.

While the present invention has been described in detail and pictorially in the accompanying drawings it is not limited to such details since many changes and modifications recognizable to those of ordinary skill in the art may be made to the invention without departing from the spirit and the scope thereof.

What is claimed is:

1. An interface apparatus for interfacing a signal producing apparatus to display apparatus having a display screen and an audio output device by use of optical signals, said signal producing apparatus produces video, audio, control and digital data signals, said interface apparatus comprising:

a first converter for converting at least two of said signals produced by said signal producing apparatus into an optical signal;

a first set of light guides for guiding said optical signal for transmission from a transmitting unit to a receiving unit, said first set of light guides includes a spatial transmission light guide and a near-by transmission light guide;

a second set of light guides for receiving said optical signal from said transmitting unit and guiding said optical signal into said receiving unit, said second set of light guides includes a spatial receiving light guide and a near-by receiving light guide;

a switch for applying said optical signal to said spatial transmission light guide for transmission of said optical signal from said spatial transmission light guide to said spatial receiving light guide when spatial transmission between said transmitting unit and said receiving unit is to be conducted and applying said optical signal to said near-by transmission light guide for transmission of said optical signal from said near-by transmission light guide to said near-by receiving light guide when near-by transmission between said transmitting unit and said receiving unit is to be conducted; and a second converter for converting said optical signal received by said receiving unit from the spatial or near-by receiving light guides into said at least two signals for use by said display apparatus.

2. An interface apparatus according to claim 1, wherein said first and second sets of light guides attenate said optical signal at different levels from each other.

3. An interface apparatus according to claim 1, wherein said first set of light guides emits said optical signal from a side portion of said transmitting unit.

4. An interface apparatus according to claim 1, wherein said transmitting unit includes said first converter and said first set of light guides.

5. An interface apparatus according to claim 4, wherein said transmitting unit is detachably connectable to said signal producing apparatus.

6. An interface apparatus according to claim 1, further comprising:

a first filter for filtering said optical signal from said first set of light guides prior to transmission of said optical signal to said receiving unit; and a second filter for filtering said optical signal transmitted from said first set of light guides prior to receiving said optical signal in said second set of light guides.

7. An apparatus for transmitting an optical signal representing at least two of video, audio, control and digital data signals from a transmitting unit to a receiving unit comprising:

a modulator for modulating each of said at least two signals;

an electrical-optical converter for converting said at least two signals modulated by said modulator into an optical signal;

a first set of light guides for guiding said optical signal obtained by conversion in said electrical-optical converter for emission from said transmission unit to said receiving unit, said first set of light guides includes a spatial transmission light guide and a near-by transmission light guide;

a second set of light guides for receiving said optical signal from said transmitting unit and guiding said optical signal into said receiving unit, said second set of light guides includes a spatial receiving light guide and a near-by receiving light guide;

a switch for applying said optical signal to said spatial transmission light guide for transmission of said optical signal from said spatial transmission light guide to said spatial receiving light guide when spatial transmission between said transmitting unit and receiving unit is to be conducted and applying said optical signal to said near-by transmission light guide for transmission of said optical signal from said near-by transmission light guide to said near-by receiving light guide when near-by transmission between said transmitting unit and said receiving unit is to be conducted;

an optical-electrical converter for converting an optical signal received by the receiving unit from the spatial or near-by receiving light guides into an electrical signal; and a demodulator for demodulating said electrical signal obtained by conversion in said optical-electrical converter thereby obtaining said at least two signals.

8. An apparatus according to claim 7, wherein said first and second sets of light guides attenuate said optical signal at different levels from each other.

9. An apparatus according to claim 7, wherein said first set of light guide emits said optical signal from a side portion of said transmitting unit.

10. An apparatus according to claim 7, further comprising:

a first filter for filtering said optical signal from said first set of light guides prior to transmission of said optical signal to said receiving unit; and a second filter for filtering said optical signal transmitted from said first set of light guides prior to receiving said optical signal in said second set of light guides.

11. An apparatus for transmitting an optical signal representing at least two of video, audio, control, and digital data signals from a transmitting unit to a receiving unit, comprising:

a modulator for modulating each of said at least two signals;

a multiplexer for frequency-multiplexing said at least two signals modulated by said modulator;

an electrical-optical converter for converting the signal obtained by multiplexing in said multiplexer into an optical signal;

a first set of light guides for guiding said optical signal obtained by converting in said first electrical-optical converter for emission from said transmitting unit to said receiving unit, said first set of light guides includes a spatial transmission light guide and a near-by transmission light guide;

a second set of light guides for receiving said optical signal emitted from said transmitting unit and guiding said optical signal into said receiving unit, said second set of light guides includes a spatial receiving light guide and a near-by receiving light guide;

a switch for applying said optical signal to said spatial transmission light guide for transmission of said optical signal from said spatial transmission light guide to said spatial receiving light guide when spatial transmission between said transmitting unit and said receiving unit is to be conducted and applying said optical signal to said near-by transmission light guide for transmission of said optical signal from said near-by transmission light guide to said near-by receiving light guide when near-by transmission between said transmitting unit and said receiving unit is to be conducted;

an optical-electrical converter for converting said optical signal received by said receiving unit from said spatial or near-by receiving light guides into an electric signal; and a demodulator for demodulating said electric signal obtained by conversion in said optical-electrical converter thereby obtaining said at least two signals.

12. An apparatus according to claim 11, wherein said first and second set of light guides attenuate said optical signal at different levels from each other.

13. An apparatus according to claim 11, wherein said first set of light guides emits said optical signal from a side portion of said transmitting unit.

14. An apparatus according to claim 11 wherein said optical-electrical converter comprises:

a plurality of optical-electrical conversion units for converting said optical signal received by said receiving unit from said spatial or near-by receiving light guides into a plurality of electric signals; and a selection circuit for selecting one of said electric signals having a maximum signal amplitude and supplying said selected electric signal to said demodulator.

15. An apparatus according to claim 14, wherein said selection circuit, when selecting an electric signal having a maximum signal amplitude from the plurality of electric signals, determines whether the signal amplitude is maximum or not according to whether the signal amplitude of the video signal included in the electric signal is maximum or not.

16. An apparatus according to claim 14, wherein said selection circuit, when selecting an electric signal having a maximum signal amplitude from the plurality of electric signals, determines whether the signal amplitude is maximum or not according to whether the signal amplitude of the audio signal included in the electric signal is maximum or not.

17. An apparatus according to claim 14, wherein said selection circuit, when selecting an electric signal having a maximum signal amplitude from the plurality of electric signals, determines whether the signal amplitude is maximum or not according to whether the signal amplitude of the control signal included in the electric signal is maximum or not.

18. An apparatus according to claim 14, wherein said selection circuit, when selecting an electric signal having a maximum signal amplitude from the plurality of electric signals, determines whether the signal amplitude is maximum or not according to whether the signal amplitude of the digital data included in the electric signal is maximum or not.

19. An apparatus according to claim 11 wherein said electrical-optical converter comprises:

at least two electrical-optical conversion units each converting one of said at least two signals modulated by said modulator into an optical signal;

wherein said first set of light guides guides at least two of said optical signals obtained by conversion in said at least two electrical-optical conversion units for emission from said transmitting unit.

20. An apparatus according to claim 19, wherein said optical-electrical converter comprises:

a plurality of optical-electrical conversion units for converting said at least two optical signals received by said receiving unit from said spatial or near-by receiving light guides into a plurality of electric signals; and a selection circuit for selecting one of said electric signals having a maximum signal amplitude and supplying said selected electric signal to said demodulator.

21. An apparatus according to claim 20, wherein said selection circuit, when selecting an electric signal having a maximum signal amplitude from the plurality of electric signals, determines whether the signal amplitude is maximum or not according to whether the signal amplitude of the video signal included in the electric signal is maximum or not.

22. An apparatus according to claim 20, wherein said selection circuit, when selecting an electric signal having a maximum signal amplitude from the plurality of electric signals, determines whether the signal amplitude is maximum or not according to whether the signal amplitude of the audio signal included in the electric signal is maximum or not.

23. An apparatus according to claim 20, wherein said selection circuit, when selecting an electric signal having a maximum signal amplitude from the plurality of electric signals, determines whether the signal amplitude is maximum or not according to whether the signal amplitude of the control signal included in the electric signal is maximum or not.

24. An apparatus according to claim 20, wherein said selection circuit, when selecting an electric signal having a maximum signal amplitude from the plurality of electric signals, determines whether the signal amplitude is maximum or not according to whether the signal amplitude of the digital data included in the electric signal is maximum or not.

25. An apparatus according to claim 11, further comprising:
   a first filter for filtering said optical signal from said first set of light guides prior to transmission of said optical signal to said receiving unit; and
   a second filter for filtering said optical signal transmitted from said first set of light guides prior to receiving said optical signal in said second set of light guides.

26. An apparatus for transmitting an optical signal representing at least two of video, audio, control and digital data signals from a transmitting unit to a receiving unit, comprising:
   a modulator for modulating each of said at least two signals;
   a multiplexer for frequency-multiplexing said at least two signals modulated by said modulator;
   an electrical-optical converter for converting the signal obtained by multiplexing in said multiplexer into an optical signal;
   a first light guide, positionable near said receiving unit for guiding said optical signal from said unit, transmitting unit for emission to said receiving unit so as to conduct near-by transmission of said optical signal from said transmitting unit to said receiving unit;
   a second light guide for receiving said optical signal emitted from said transmitting unit and guiding said optical signal into said receiving unit;
   an optical-electrical converter for converting said optical signal received and guided by said light guide into an electric signal; and
   a demodulator for demodulating said electric signal obtained by conversion in said optical-electrical converter thereby obtaining said at least two signals.

27. An apparatus according to claim 26, wherein said optical-electrical converter comprises:
   a plurality of optical-electrical conversion units for converting said optical signal received and guided by said second light guide into respective electric signals; and
   a selection unit for selecting one of said electric signals having a maximum signal amplitude and supplying said selected electric signal to said demodulator.

28. An apparatus according to claim 27, wherein said selection circuit, when selecting an electric signal having a maximum signal amplitude from the plurality of electric signals, determines whether the signal amplitude is maximum or not according to whether the signal amplitude of the video signal included in the electric signal is maximum or not.

29. An apparatus according to claim 27, wherein said selection circuit, when selecting an electric signal having a maximum signal amplitude from the plurality of electric signals, determines whether the signal amplitude is maximum or not according to whether the signal amplitude of the audio signal included in the electric signal is maximum or not.

30. An apparatus according to claim 27, wherein said selection circuit, when selecting an electric signal having a maximum signal amplitude from the plurality of electric signals, determines whether the signal amplitude is maximum or not according to whether the signal amplitude of the control signal included in the electric signal is maximum or not.

31. An apparatus according to claim 27, wherein said selection circuit, when selecting an electric signal having a maximum signal amplitude from the plurality of electric signals, determines whether the signal amplitude is maximum or not according to whether the signal amplitude of the digital data included in the electric signal is maximum or not.

32. An apparatus according to claim 26, wherein said electrical-optical converter comprises:
   at least two electrical-optical conversion units each converting one of said at least two signals modulated by said modulator into an optical signal for transmission from said transmitting unit.

33. An apparatus according to claim 32, wherein said optical-electrical converter comprises:
   a plurality of optical-electrical conversion units for converting said optical signals received and guided by said second light guide into respective electric signals; and
   a selection unit for selecting at least two of said electric signals having a maximum signal amplitude and supplying said selected electric signals to said demodulator.

34. An apparatus according to claim 33, wherein said selection circuit, when selecting an electric signal having a maximum signal amplitude from the plurality of electric signals, determines whether the signal amplitude is maximum or not according to whether the signal amplitude of the video signal included in the electric signal is maximum or not.

35. An apparatus according to claim 33, wherein said selection circuit, when selecting an electric signal having a maximum signal amplitude from the plurality of electric signals, determines whether the signal amplitude is maximum or not according to whether the signal amplitude of the audio signal included in the electric signal is maximum or not.

36. An apparatus according to claim 33, wherein said selection circuit, when selecting an electric signal having a maximum signal amplitude from the plurality of electric signals, determines whether the signal amplitude is maximum or not according to whether the signal amplitude of the control signal included in the electric signal is maximum or not.

37. An apparatus according to claim 33, wherein said selection circuit, when selecting an electric signal having a maximum signal amplitude from the plurality of electric signals, determines whether the signal amplitude is maximum or not according to whether the signal amplitude of the digital data included in the electric signal is maximum or not.

38. An apparatus according to claim 26, wherein said first and second light guides attenuate said optical signal at levels different from each other.

39. An apparatus according to claim 26, further comprising:
   a first filter for filtering said optical signal from said first light guide prior to transmission of said optical signal to said receiving unit; and
   a second filter for filtering said optical signal transmitted from said first light guide prior to receiving said optical signal in said second light guide.

40. An apparatus for transmitting an optical signal representing at least two of video, audio, control and digital data signals from a transmitting unit to a receiving unit, comprising:
   a modulator for modulating each of said at least two signals;

a multiplexer for frequency-multiplexing said at least two signals modulated by said modulator;

an electrical-optical converter for converting the signal obtained by multiplexing in said multiplexer into an optical signal;

a light guide for spatially emitting said optical signal from said transmitting unit to said receiving unit;

a filter for filtering said optical signal from said light guide prior to emission from said transmitting unit to said receiving unit;

an optical-electrical converter for receiving said spatially emitted optical signal filtered by said filter and converting said received optical signal into an electric signal; and a demodulator for demodulating said electric signal obtained by conversion in said optical-electrical converter thereby obtaining said at least two signals.

41. An apparatus according to claim 40, wherein said optical-electrical converter comprises:

a plurality of optical-electrical conversion units for converting said received optical signal into respective electric signals; and a selection unit for selecting one of said electric signals having a maximum signal amplitude and supplying said selected electric signal to said demodulator.

42. An apparatus according to claim 41, wherein said selection circuit, when selecting an electric signal having a maximum signal amplitude from the plurality of electric signals, determines whether the signal amplitude is maximum or not according to whether the signal amplitude of the video signal included in the electric signal is maximum or not.

43. An apparatus according to claim 41, wherein said selection circuit, when selecting an electric signal having a maximum signal amplitude from the plurality of electric signals, determines whether the signal amplitude is maximum or not according to whether the signal amplitude of the audio signal included in the electric signal is maximum or not.

44. An apparatus according to claim 43, wherein said selection circuit, when selecting an electric signal having a maximum signal amplitude from the plurality of electric signals, determines whether the signal amplitude is maximum or not according to whether the signal amplitude of the digital data included in the electric signal is maximum or not.

45. An apparatus according to claim 41, wherein said selection circuit, when selecting an electric signal having a maximum signal amplitude from the plurality of electric signals, determines whether the signal amplitude is maximum or not according to whether the signal amplitude of the control signal included in the electric signal is maximum or not.

46. An apparatus according to claim 40, wherein said electrical-optical converter comprises:

at least two electrical-optical conversion units each converting one of said at least two signals modulated by said modulator into an optical signal for transmission from said transmitting unit.

47. An apparatus according to claim 46, wherein said optical-electrical converter comprises:

a plurality of optical-electrical conversion units for converting said received optical signals into respective electric signals; and a selection unit for selecting at least two of said electric signals having a maximum signal amplitude and supplying said selected electric signals to said demodulator.

48. An apparatus according to claim 47, wherein said selection circuit, when selecting an electric signal having a maximum signal amplitude from the plurality of electric signals, determines whether the signal amplitude is maximum or not according to whether the signal amplitude of the video signal included in the electric signal is maximum or not.

49. An apparatus according to claim 47, wherein said selection circuit, when selecting an electric signal having a maximum signal amplitude from the plurality of electric signals, determines whether the signal amplitude is maximum or not according to whether the signal amplitude of the audio signal included in the electric signal is maximum or not.

50. An apparatus according to claim 47, wherein said selection circuit, when selecting an electric signal having a maximum signal amplitude from the plurality of electric signals, determines whether the signal amplitude is maximum or not according to whether the signal amplitude of the control signal included in the electric signal is maximum or not.

51. An apparatus according to claim 47, wherein said selection circuit, when selecting an electric signal having a maximum signal amplitude from the plurality of electric signals, determines whether the signal amplitude is maximum or not according to whether the signal amplitude of the digital data included in the electric signal is maximum or not.

52. An apparatus according to claim 40, wherein said light guide attenuates said optical signal at a predetermined level.

53. An apparatus according to claim 40, further comprising:

a filter for filtering said optical signal transmitted from said light guide prior to receiving said optical signal in said optical-electrical converter.

\* \* \* \* \*